2,914,531
NEW DYESTUFFS OF THE PERI-DICARBOXYLIC ACID IMIDE SERIES

Max Staeuble, Basel, and Kurt Weber, Bottmingen, Switzerland, assignors to Ciba Limited, Basel, Switzerland, a firm of Switzerland No Drawing. Application March 11, 1958
Serial No. 720,528

Claims priority, application Switzerland March 18, 1957

9 Claims. (Cl. 260—249.5)

This invention provides new dyestuffs of the peri-dicarboxylic acid imide series, which contain at least one acid group imparting solubility in water and at least one radical containing at least one mobile halogen atom.

As peri-dicarboxylic acid imide dyestuffs there are to be understood dyestuffs which contain the grouping of the formula (I) 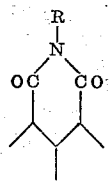

in which R represents a hydrogen atom or an alkyl or aryl group. The simplest members of this class of dyestuffs are the yellow 4-naphthalic acid imides of the formula (II) 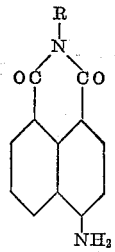

which, when they contain at least one acid group imparting solubility in water, are valuable as dyestuffs for wool. The perylene tetracarboxylic acid imides of the formula (III) 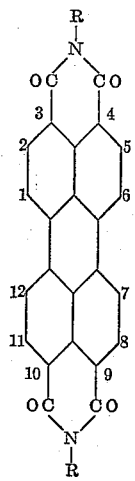

are valuable red to violet vat dyestuffs.

Of special interest are those dyestuffs which contain a group of the formula

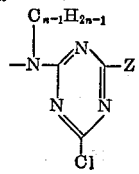

in which $n$ represents a whole number not greater than 5, and Z represents a chlorine atom, a hydroxyl group, an alkoxy group, or an amino group which may be substituted by an alkyl or hydroxyalkyl group, for example, an hydroxyethyl group or a colorless or colored aryl radical, especially one containing a group imparting solubility in water.

As an example of a colorless aryl radical there may be mentioned the benzene radical and as a colored aryl radical an aryl amino-anthraquinone radical.

The new dyestuffs are made by reacting a peridicarboxylic acid imide dyestuff, which contains an acylatable amino group, with a compound containing at least two mobile halogen atoms, and, if desired, exchanging one or more mobile halogen atoms in the resulting compound for another substituent, and so selecting the reaction components that at least one of them contains an acid group imparting solubility in water, and the process being carried out in such manner that the final product contains at least one mobile halogen atom.

As compound containing at least two mobile halogen atoms there may be mentioned, more especially, six-membered heterocyclic compounds containing at least two nitrogen atoms in the ring, for example, dichloro-1:3-diazines, but especially trichloro-1:3:5-triazine (cyanuric chloride). Instead of cyanuric chloride, there may be used a primary condensation product thereof which contains two chlorine atoms and, in place of the third chlorine atom, a free amino group or an organic radical, for example, the radical of an amine. There may also be used for making the dyestuffs containing a single exchangeable chlorine atom a dyestuff containing two exchangeable chlorine atoms, and replacing one of the two chlorine atoms in the dichlorotriazine dyestuff by reaction with ammonia, water or an aliphatic or aromatic amino- or hydroxy compound.

The compounds used as starting materials must contain at least one acylatable amino group and preferably also contain an acid group imparting solubility in water, for example, a carboxylic acid or sulfonic acid group. When this compound contains no groups imparting solubility in water, such a group must be present in the other reaction component.

As examples of peri-dicarboxylic acid imides suitable for the present process there may be mentioned imides of 4-amino-naphthalene-1:8-dicarboxylic acid-3-sulfonic acid, which imides are obtained by condensing the corresponding 4-nitro-naphthalic acid with a primary amine, especially one of the benzene series, reducing the nitro group, and sulfonating the product, for example, the compound of the formula (IV) 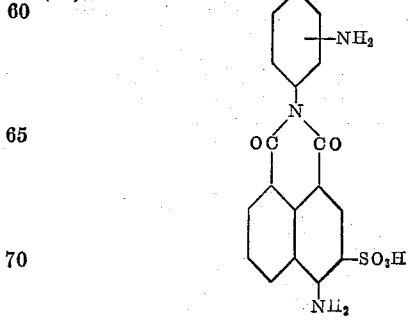

or the diimides of naphthalene-1:4:5:8-tetracarboxylic acid, for example, the compound of the formula (V)

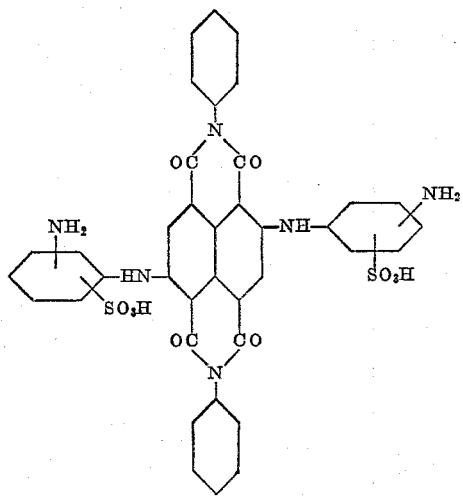

Among the perylene tetracarboxylic acid imides there may be mentioned especially those of the Formula III in which R represents the radical of an aminobenzene sulfonic acid. Such compounds are advantageously obtained by reacting the perylene tetracarboxylic acids, for example, with two molecular proportions of 1:3-diaminobenzene-4-sulfonic acid. Substituents may also be present in the perylene structure, for example, hydroxyl or alkoxy groups, especially a methoxy group in each of the 6- and 7-positions.

The reaction of the peri-dicarboxylic acid imides with the compounds containing at least two mobile halogen atoms is advantageously carried out in aqueous solution at a relatively low temperature, for example, at 0–70° C. in the presence of an acid-binding agent, for example, an alkali metal carbonate, the quantity of which must be so controlled that the pH value of the solution does not rise above 7. At a higher pH value there is a risk of exchanging all the mobile halogen atoms.

The dyestuffs of this invention are useful for dyeing or priting polyhydroxylated, especially cellulosic, materials and also synthetic fibers, for example, fibers of polyvinyl alcohol, regenerated cellulose or viscose, and also natural fibers, for example, of linen or above all cotton. For this purpose there are advantageously used solutions of the dyestuffs. The materials can be dyed with such solutions, as are advantageously more or less neutral, and which may contain above all inorganic salts, such as an alkali metal chloride or sulfate, and, if desired, also an acid-binding agent, which is preferably inorganic, such as an alkali metal carbonate, alkali metal phosphate, alkali metal borate or perborate or a mixture of two or more such salts, and may contain a buffer mixture of such agents, the dyeing being carried out advantageously in the cold or at a moderately raised temperature or, if no alkali is present, at a raised temperature, for example, at 60–80° C. During the dyeing process the dyestuffs containing the aforesaid labile substituents react with the polyhydroxylated material to be dyed, whereby they are probably fixed by chemical combination. The addition of an acid-binding agent, which is more alkaline than sodium carbonate, to the dyebath may be made at the outset of the dyeing operation. However, the alkaline agent is advantageously added in such manner that the pH value of the initially weakly acid to neutral or weakly alkaline bath slowly rises throughout the dyeing operation.

In an especially advantageous form of the process the material to be dyed is not, as in direct-dyeing methods, impregnated in a dyebath at a goods-to-liquor ratio of at least 1:3, and usually greater than 1:10, with only a portion of the quantity of dyestuff solution needed to produce the desired shade (so that the dyestuff dissolved in the dyebath can reach an equilibrium with the dyestuff on the substratum to be dyed), and dyed therein by the dyestuff being gradually absorbed by the fiber or being urged from the dyebath on to the fiber by some means, but is impregnated with the whole of the dyestuff solution needed to produce the desired shade, or is printed with a printing paste containing the dyestuff, and the dyestuff so applied to the fiber is subsequently fixed thereon.

The fixation of the dyestuff on the material impregnated with the dyestuff solution is carried out after the impregnation. For this purpose, for example, the impregnated material, if desired, after being dried, and, if the impregnating solution contains no acid-binding agent, may be treated with an aqueous alkaline solution, for example, with a salt-containing solution of an alkali metal hydroxide, at a raised temperature or in the cold followed by a short heat treatment with steam or, for example, in a current of warm air. When a practically neutral impregnating bath free from substances yielding alkali is used, the material may be allowed to stand, if desired, for a long time, before the fixation treatment is carried out, and this may be of advantage having regard to the apparatus available. Instead of carrying out the fixation with the use of a separate alkaline bath, an alkali or a substance yielding alkali, such as sodium bicarbonate, may be added to the impregnating solution at the outset, and then the impregnated material is steamed directly or subjected to a heat treatment without intermediate drying and without intermediate alkaline treatment.

Instead of preparing the impregnating solution by dissolving the appropriate dyestuff and, if desired, a more or less neutral inorganic salt, in water simultaneously or in succession, the dyestuff and the salt may be made up into a paste-like or preferably, dried preparation. The preparations used for making the impregnating solutions may contain, in addition to or instead of a salt, a non-electrolyte such as urea, and, if desired, also a buffer salt or agent capable of liberating an alkali, for example, when heated.

Instead of applying the dyestuffs by impregnation they may be applied to the material to be dyed by printing. For this purpose there is used, for example, a printing paste containing in addition to the usual printing assistants, for example, wetting and thickening agents, at least one of the dyestuffs of this invention and, if desired, an acid-binding agent or a substance capable of yielding an acid-binding agent.

Suitable assistants for making the printing pastes are, for example, urea and thickening agents such as alkoxy-celluloses, for example, methyl cellulose, or starches, alginates or the like.

Suitable acid-binding agents and substances yielding acid-binding agents are, more especially alkali metal salts such as potassium cyanate, potassium carbonate, sodium carbonate or bicarbonate, di- and tri-sodium phosphate, or mixtures of mono-, di- and tri-sodium phosphates, and also alkali metal or alkaline earth metal hydroxides, more especially sodium hydroxide. When the printing paste to be used does not contain such an agent, the printed material is treated with an alkali, preferably with a solution containing a salt in high concentration and an alkali metal carbonate or an alkali metal or alkaline earth metal hydroxide, and then subjected to the action of heat, if desired, in the presence of steam. When the printing paste contains an acid-binding agent or a substance of which the alkalinity increases, for example, when it is heated, the printed material needs no alkaline treatment before being heated or steamed.

By the process of this invention very valuable strong and generally very full dyeings and prints having excellent properties of wet fastness and of very good fastness to light are produced on polyhydroxylated, especially cellulosic, materials, even with those dyestuffs of the invention that possess no affinity or no pronounced affinity for cotton.

In certain cases it may be of advantage to subject the dyeings or prints produced by the process of this invention to an after-treatment. Thus, for example, it may be of advantage to soap the dyeings in order to remove any incompletely fixed dyestuff. When the dyestuff used for the dyeing or printing contains metallizable groups, the dyeing or printing may be subjected to an after-treatment with an agent yielding a heavy metal, more especially an agent yielding copper.

The following examples illustrate the invention, the parts and percentages being by weight unless otherwise stated and the relationship of parts by weight to parts by volume being the same as that of the kilogram to the liter. Although the dyestuffs are referred to in the form of the free acids, they are used in the form of an alkali metal salt thereof.

Example 1

3.9 parts of the di-condensation product of perylene-3:4:9:10-tetracarboxylic acid with 1:3-diaminobenzene-4-sulfonic acid were dissolved at a raised temperature in the form of the disodium salt of the formula

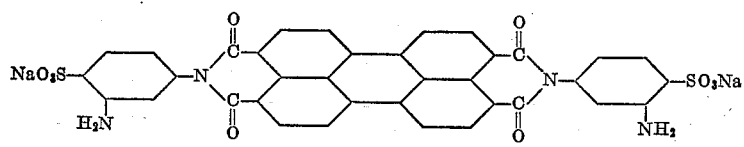

in 200 parts of water, and, after cooling the solution to 60° C., a suspension of 3.4 parts of 2:4-dichloro-6-phenylamino-1:3:5-triazine-4'-sulfonic acid as the sodium salt in 20 parts of water are added. The whole is heated to 60–65° C., while stirring and continuously controlling the pH value, and the hydrochloric acid liberated is neutralized by the gradual addition of a total of 5.5 parts by volume of a 2N-solution of sodium carbonate in such manner that the pH value of the solution is maintained between 5.0 and 7.0. From the red solution the new dyestuff is precipitated by the addition of sodium chloride, and the dyestuff is filtered off and dried in vacuo at 70° C. The dyestuff should have the constitution

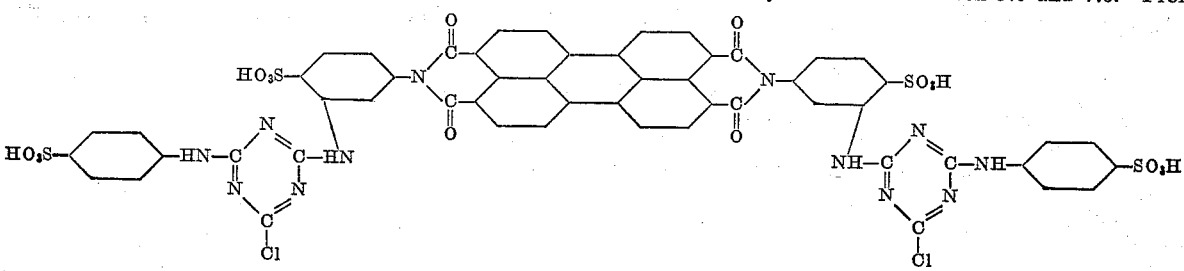

It dyes cotton and regenerated cellulose bluish red tints of very good fastness to washing by the following dyeing method:

2 parts of the dyestuff are dissolved in 80 parts of trisodium phosphate in 400 parts of water and the solution is diluted to 4000 parts. After the addition of 80 parts of sodium chloride, 100 parts of a cotton fabric are entered into the dyebath, the temperature is raised to 60° C. in the course of ½ hour, a further 80 parts of sodium chloride are added, the temperature is raised to 80° C. in the course of ¼ hour, and the whole is maintained at that themperature for ½ hour. The yellow dyeing so obtained is rinsed and soaped for 15 minutes in a boiling solution of 0.3% strength of a non-ionic detergent. There is obtained a bluish red dyeing which is very fast to washing.

Instead of trisodium phosphate, there may be used with equal success sodium carbonate.

The di-condensation product of perylene-3:4:9:10-tetracarboxylic acid with 1:3-diaminobenzene-4-sulfonic acid used for making the above dyestuff can be made, for example, by heating the finely pulverized starting materials in boiling nitrobenzene with the addition of potassium carbonate for 20 hours. Alternatively, the di-condensation product can be obtained by heating perylene-3:4:9:10-tetracarboxylic acid and the sodium salt of 1:3-diaminobenzene-4-sulfonic acid in the molecular ratio 1:2.5 in an aqueous weakly acetic acid medium for 15 hours at 190–200° C. in an autoclave.

Example 2

39 parts of the di-condensation product of perylene-3:4:9:10-tetracarboxylic acid with 1:4-diaminobenzene-2-sulfonic acid are dissolved at a raised temperature as the disodium salt of the formula

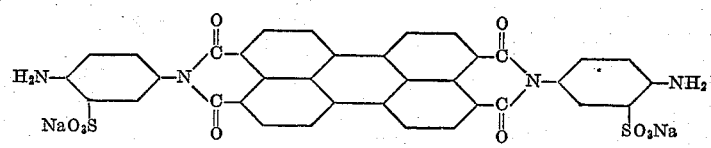

in 2000 parts of water, and, after cooling the solution to 0° C., a clear solution of 18.5 parts of cyanuric chloride in 80 parts of acetone is added, while stirring. At a temperature of 0–4° C. a total of 100 parts by volume of a 1 N-solution of sodium hydroxide are slowly added dropwise in such manner that the pH value of the solution is continuously maintained between 5.0 and 7.0. From the dark red solution the new dyestuff is salted out by the addition of sodium chloride. It is filtered off and washed with a solution of 5 parts of disodium phosphate, 3 parts of monopotassium phosphate and 30 parts of sodium chloride in 200 parts of water, then sharply filtered with suction, and dried in vacuo at 30–40° C.

The dyestuff has the probable formula

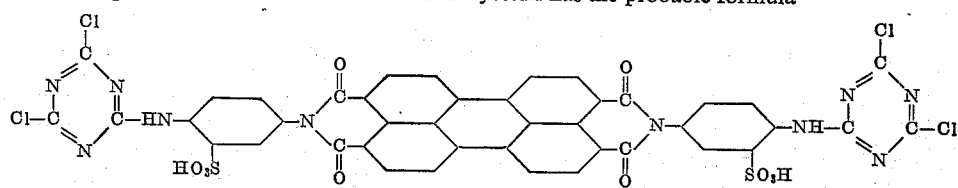
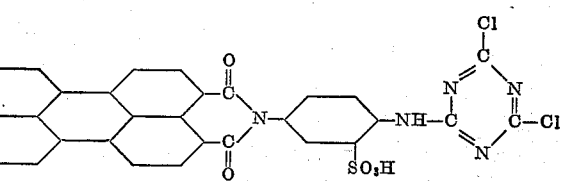

and dyes wool and regenerated cellulose by the method described in Example 1 bluish red tints of very good fastness to washing and chlorine.

The above dyestuff can also be used for dyeing by the following method:

2 parts of the dyestuff are dissolved in 2000 parts of cold water. There are then added 100 parts of sodium carbonate solution of 10% strength and 250 parts of sodium chloride solution of 20% strength. 100 parts of well wetted cotton yarn are entered into the resulting dyebath at 20–30° C., and after 30 minutes a further 250 parts of sodium chloride solution of 20% strength are added. Dyeing is continued for 60 minutes at 25–35° C. The resulting bluish red dyeing is then rinsed with cold water, soaped at 80–100° C., and thoroughly rinsed in cold water and dried. There is obtained a bluish red dyeing which is fast to washing and chlorine.

The di-condensation product of perylene-3:4:9:10-tetracarboxylic acid with the sodium salt of 1:4-diamino-benzene-2-sulfonic acid used for making the above dyestuff can be obtained, for example, by heating the reaction components in the molecular ratio 1:2.5 in an aqueous weakly acetic acid medium for 15 hours in an autoclave at 145–150° C.

instead of 2:4-dichloro-6-phenylamino-1:3:5-triazine-3'-sulfonic acid, 2:4-dichloro-6-phenylamino-1:3:5-triazine-2'-sulfonic acid or 2:4-dichloro-6-phenylamino-1:3:5-triazine-4'-sulfonic acid, or an equimolecular quantity of the monocondensation product of 1-aminobenzene-2:5-disulfonic acid with cyanuric chloride or of 2-aminonaphthalene-6-sulfonic acid with cyanuric chloride or of 2-aminonaphthalene-4:8-disulfonic acid with cyanuric chloride, dyestuffs having similar properties are obtained.

*Example 4*

39 parts of the di-condensation product of perylene-3:4:9:10-tetracarboxylic acid with 1:4-diaminobenzene-2-sulfonic acid are condensed with 18.5 parts of cyanuric chloride in the manner described in Example 2. When the condensation is finished, 150 parts by volume of 2 N-solution of ammonium hydroxide are run in and the whole is heated for a further hour at 35° C. while stirring.

By the addition of sodium chloride the dyestuff of the probable formula

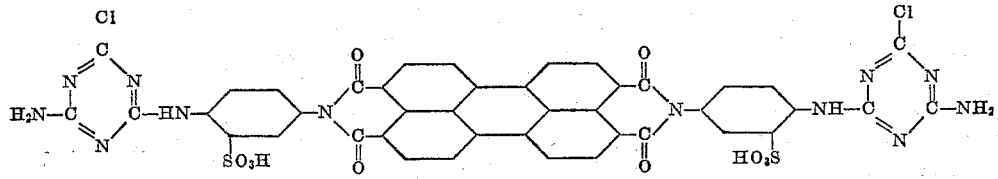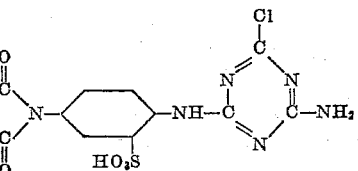

*Example 3*

39 parts of the di-condensation product of perylene-3:4:9:10-tetracarboxylic acid with 1:4-diaminobenzene-2-sulfonic acid are dissolved in 2000 parts of hot water to give a neutral solution, and, after cooling the solution to 60° C., 34.3 parts of the sodium salt of 2:4-dichloro-6-phenylamino-1:3:5-triazine-3'-sulfonic acid are added while stirring. The mineral acid liberated during the condensation is neutralized by the gradual addition of 55 parts by volume of a 2 N-solution of sodium carbonate in such manner that the pH value is maintained between 5.5 and 7.0 at a reaction temperature of 60–70° C. From the red solution the dyestuff is salted out by the addition of sodium chloride, and is then filtered off and dried at 70–80° C. in vacuo.

The dyestuff should have the following constitution:

is precipitated from the solution, and is then isolated by filtration and dried in vacuo at 70° C.

The dyestuff so obtained dyes cotton and regenerated cellulose by the dyeing method described in Example 3 red tints which are fast to chlorine, washing and light.

By using in this example, instead of a 2 N-solution of ammonium hydroxide, 15 parts of a solution of monomethylamine of 40% strength or 100 parts by volume of a 1 N-solution of sodium hydroxide or 15 parts of monoethanolamine or 25 parts of diethanolamine, there are obtained dyestuffs having similar properties.

*Example 5*

20 parts of ice are added to a solution of 1.9 parts of cyanuric chloride in 10 parts of acetone while stirring. The fine suspension of cyanuric chloride so obtained is then poured into a solution, cooled to 0° C., of 1.4 parts

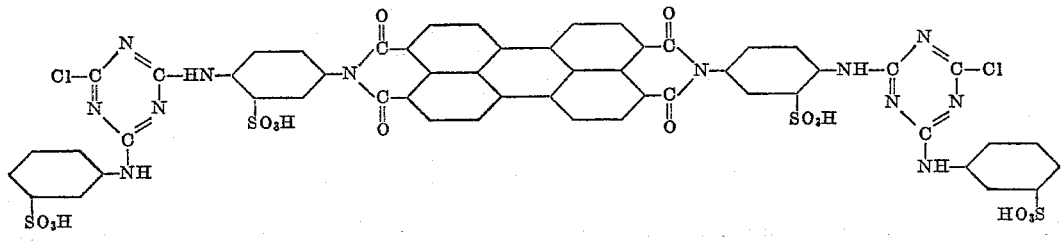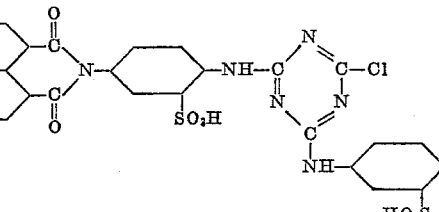

It dyes cotton red tints of good fastness to chlorine, washing and light by the following method:

1 part of the dyestuff is dissolved in 100 parts of water. A cotton fabric is impregnated with the solution on a foulard at 80° C., and the excess liquid is squeezed off until the material retains 75% of its weight of dyestuff solution. The material so impregnated is then dried, and impregnated at room temperature in a solution containing, per liter, 10 grams of sodium hydroxide and 300 grams of sodium chloride, the material is squeezed until it retains 75% of its weight of liquid, and is steamed for 60 seconds at 100–101° C. It is then rinsed, treated in a sodium bicarbonate solution of 0.5% strength, rinsed, soaped for ¼ hour in a solution of 0.3% strength of a non-ionic detergent, at the boil, rinsed and dried. There is obtained a red dyeing which is fast to boiling.

By using in this example for making the dyestuff, of 4-aminobenzoic acid in 40 parts of water and 10 parts by volume of a 1 N-solution of sodium hydroxide. The whole is stirred at a pH value of 6.0 to 7.0 until aminobenzoic acid can no longer be detected.

Into the resulting condensation product of equimolecular proportions of cyanuric chloride and 4-aminobenzoic acid is run a solution of 3.9 parts of the di-condensation product of perylene-3:4:9:10-tetracarboxylic acid with 1:4-diaminobenzene-2-sulfonic acid in 200 parts of water. A total of 20 parts by volume of a 1 N-solution of sodium hydroxide is added at 60–70° C. corresponding with the gradual liberation of mineral acid so that the pH value of the mixture is maintained between 6.0 and 7.0 up to the end of the condensation.

By the addition of sodium chloride the dyestuff is completely precipitated, and then isolated by filtration and dried in vacuo at 70° C.

This dyestuff of the formula

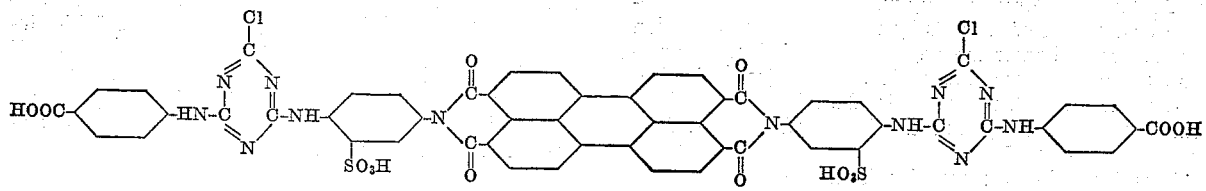

dyes cotton and regenerated cellulose by the method described in Example 3 red tints of good fastness to chlorine, washing and light.

By using in this example, instead of the 4-aminobenzoic acid, an equimolecular quantity of 2-aminobenzoic acid or 3-amino-benzoic acid, dyestuffs having similar properties are obtained.

*Example 6*

39 parts of the di-condensation product of perylene-3:4:9:10-tetracarboxylic acid with 1:4-diaminobenzene-

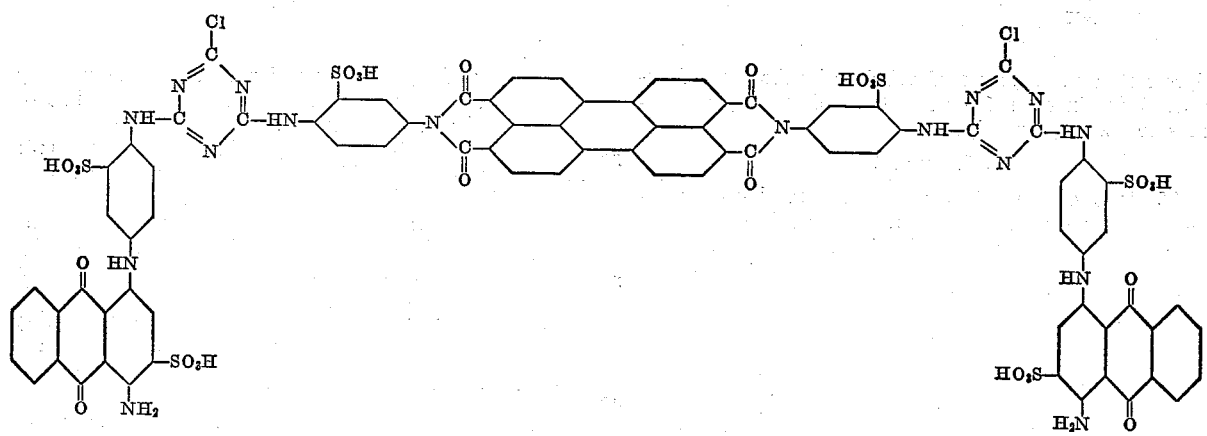

2-sulfonic acid are condensed with 18.5 parts of cyanuric chloride as described in Example 2. When the condensation is finished, a solution of 19.6 parts of the sodium salt of 1-hydroxybenzene-3-sulfonic acid in 300 parts of water is run in, and the whole is heated to 50–60° C. Corresponding with the liberation of mineral acid the mixture is maintained at a pH value of 5.0 to 7.0 by the addition of a total of 55 parts by volume of a 2 N-solution of sodium carbonate, while stirring.

By the addition of sodium chloride the dyestuff is precipitated, and it is then isolated by filtration and dried at 70° C.

This dyestuff of the formula

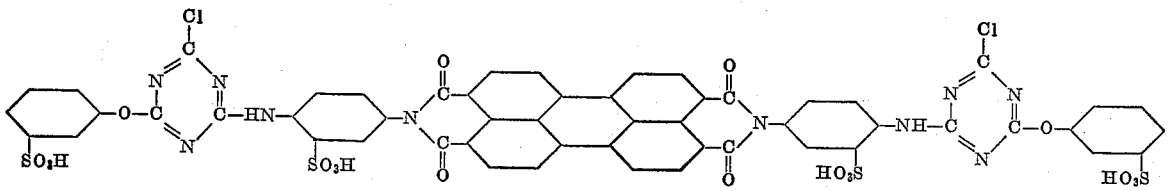

dyes cotton and regenerated cellulose by the method described in Example 3 red tints of good fastness to chlorine, washing and light.

*Example 7*

39 parts of the di-condensation product of perylene-3:4:9:10-tetracarboxylic acid with 1:4-diaminobenzene-2-sulfonic acid are condensed with 18.5 parts of cyanuric chloride as described in Example 2. When the condensation is finished, there is immediately added a solution of 53.3 parts of the disodium salt of 1-amino-4-(4'-amino- phenylamino)anthraquinone-2:3'-disulfonic acid in 1000 parts of water. The whole is heated to 50–60° C. and the mineral acid liberated during the condensation is neutralized, while stirring, by the addition of a total of 55 parts by volume of a 2 N-solution of sodium carbonate in such manner that the pH value is maintained between 5.0 and 7.0. The dyestuff is salted out by the addition of sodium chloride, filtered off and dried in vacuo at 70–80° C.

This dyestuff of the probable formula dyes cotton and regenerated cellulose by the method described in Example 3 violet tints of very good fastness to washing and light.

*Example 8*

39 parts of the di-condensation product of perylene-3:4:9:10-tetracarboxylic acid with 1:4-diaminobenzene-2-sulfonic acid are condensed with 18.5 parts of cyanuric chloride as described in Example 2. When the condensation is finished, there is immediately added a solution of 42 parts of the sodium salt of 1-phenylamino-4-amino-thioxanthone sulfonic acid of the formula

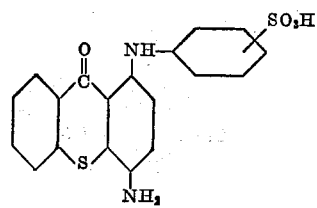

in 1000 parts of water, and the whole is slowly heated to 50–60° C. Corresponding with the liberation of mineral acid a total of 55 parts by volume of a 2 N-solution of sodium carbonate are added, while stirring, to maintain the pH value at 5.0 to 7.0. The dyestuff is then precipitated from the solution by the addition of sodium chloride, and the dyestuff is filtered off and dried in vacuo at 70–80° C.

This dyestuff of the probable formula

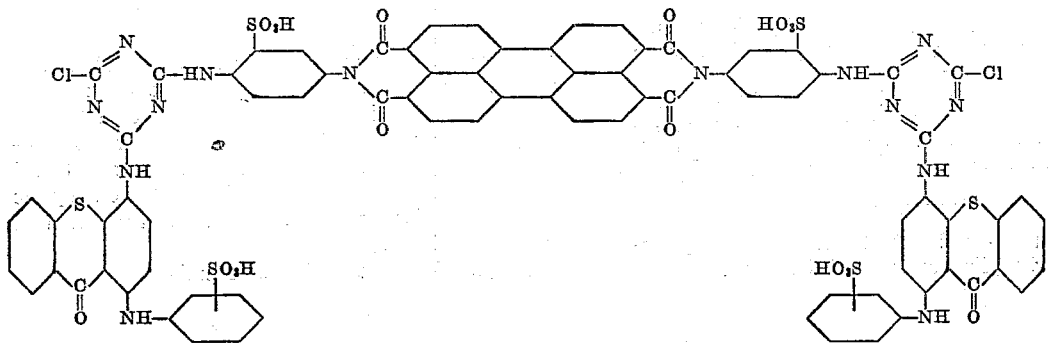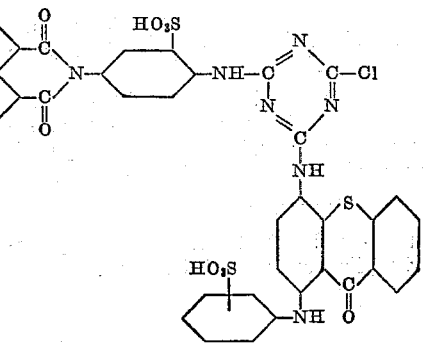

dyes cotton and regenerated cellulose by the method described in Example 3 orange tints of very good fastness to washing and light.

*Example 9*

4.2 parts of the disodium salt of 2:6-bis-(4'-aminophenylamino)-naphthalene-1:4:5:8-tetracarboxylic acid diphenylimide disulfonic acid of the probable formula

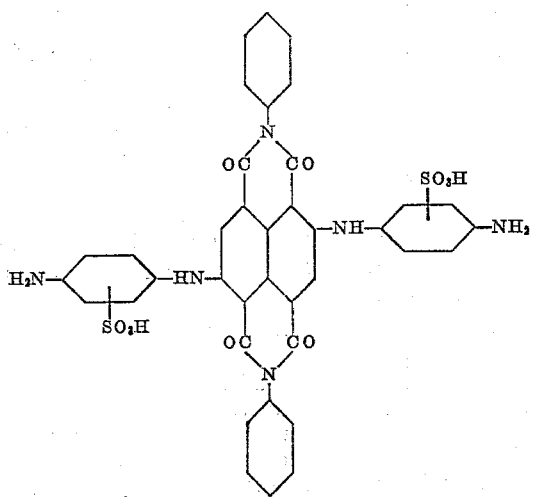

are dissolved at a raised temperature in 200 parts of water, and, after cooling the solution to 60° C. 3.4 parts of 2:4-dichloro-6-phenylamino-1:3:5-triazine-3'-sulfonic acid are added in the form of the sodium salt in 20 parts of water. The whole is heated at 60–70° C. while stirring and continuously controlling the pH value and neutralizing the liberated mineral acid by the gradual addition of a total of 5.5 parts by volume of a 2 N-solution of sodium carbonate in such manner that the pH value of the solution is maintained between 5.0 and 7.0. The dyestuff is precipitated from the solution by the addition of sodium chloride, and is then filtered off and dried at 70° C. in vacuo.

The dyestuff dyes cotton and regenerated cellulose by the method described in Example 3 bluish grey tints of very good fastness to washing.

The 2:6-bis-(4'-aminophenylamino)-naphthalene-1:4: 5:8-tetracarboxylic acid diphenylimide disulfonic acid used in this example can be prepared as follows:

10 parts of 2:6-dichloronaphthalene-1:4:5:8-tetracarboxylic acid diphenylimide (obtained as described by Vollmann, Annalen, vol. 531, page 105) are boiled with 16 parts of 1:4-diaminobenzene in 100 parts of N:N-dimethylaniline for 3 hours under reflux. Upon cooling the mixture the condensation product crystallizes in the form of small blue-green needles. It is filtered off, washed with alcohol, and dried.

For the purpose of sulfonation 10 parts of the above condensation product are stirred in 100 parts of oleum having an $SO_3$ content of 5% for 2 hours at 25–30° C. The whole is then poured on to 200 parts of ice, filtered after 2 hours, and washed until neutral with sodium chloride solution. The dried product is a dark blue powder, and is probably a disulfonic acid.

*Example 10*

42 parts of the dicondensation product of 6:7-dimethoxyperylene-3:4:9:10-tetracarboxylic acid and of the sodium salt of 1:4-diaminobenzene-2-sulfonic acid are dissolved as the disodium salt of the formula

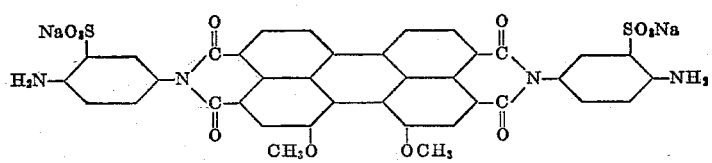

in 200 parts of water and condensed with 18.5 parts of cyanuric chloride at 0 to 4° C. as described in Example 2 and the dyestuff isolated.

The dyestuff of the formula

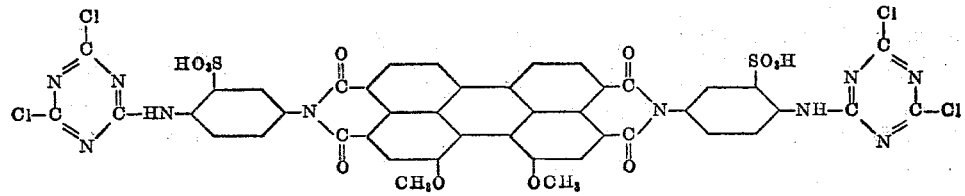

dyes cotton and regenerated cellulose by the method described in Examples 1 and 2 violet tints of very good fastness to washing.

The dicondensation product of 6:7-dimethoxy-perylene-3:4:9:10-tetracarboxylic acid and of the sodium salt

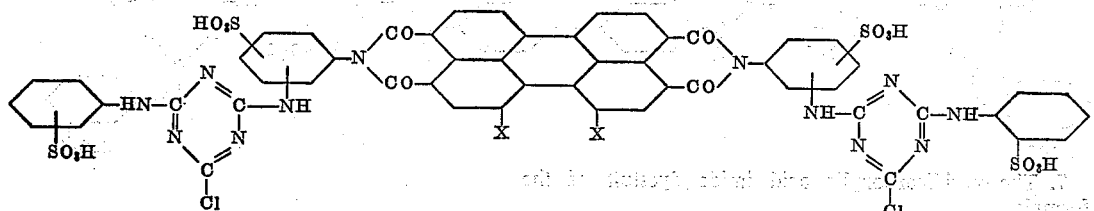

of 1:4-diaminobenzene-2-sulfonic acid used in the above example can be obtained by heating the starting materials in the molecular ratio 1:2.5 in an aqueous weakly acetic medium for 10 hours in an autoclave at 145 to 150° C.

What is claimed is:

1. Peridicarboxylic acid imide dyestuffs of the formula

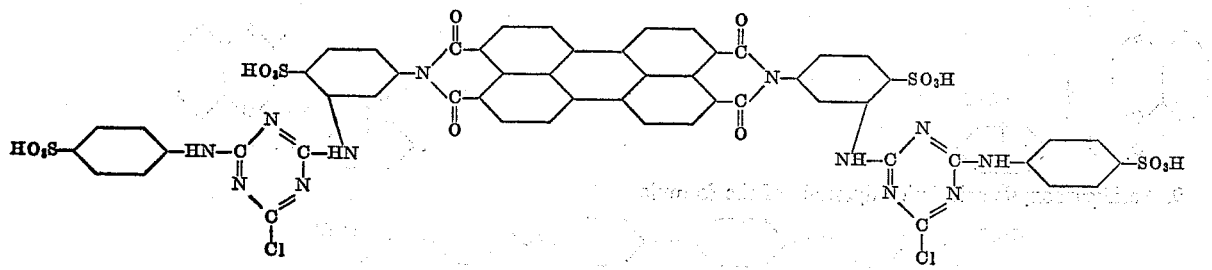

in which X represents a member selected from the group consisting of hydrogen atoms and lower alkoxy groups and Z represents a member selected from the group consisting of chlorine atoms, hydroxy, lower alkoxy, phenoxy, amino and phenyl amino groups.

2. Peridicarboxylic acid imide dyestuffs of the formula

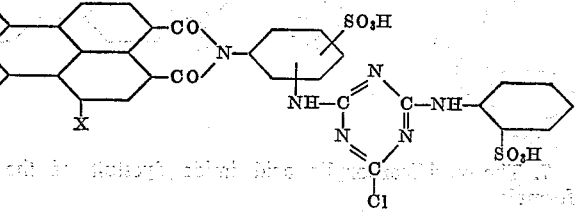

in which X represents a lower alkoxy group.

3. Peridicarboxylic acid imide dyestuffs of the formula

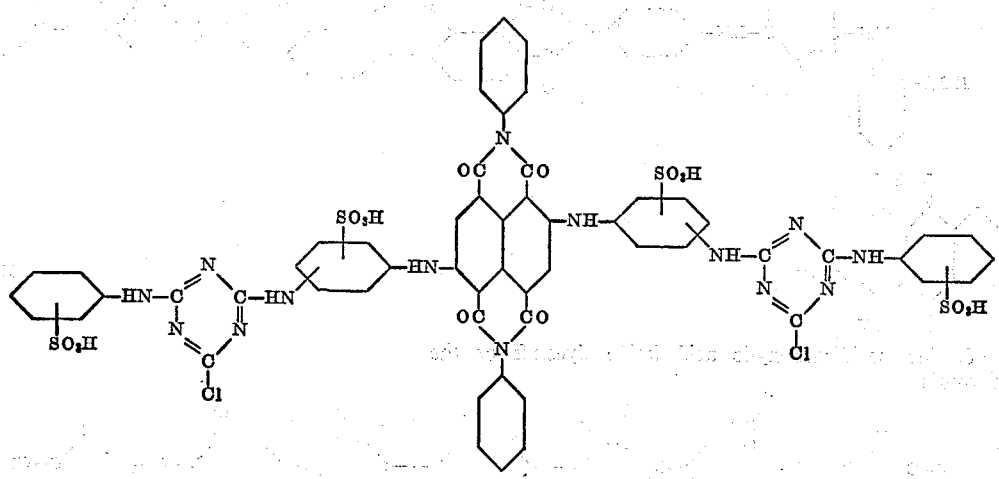

4. The peridicarboxylic acid imide dyestuff of the formula

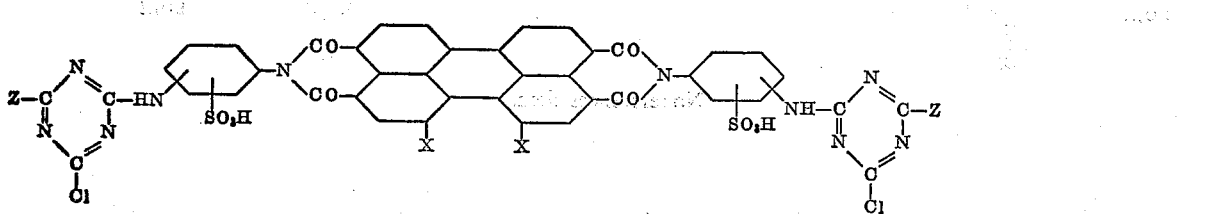

5. The peridicarboxylic acid imide dyestuff of the formula

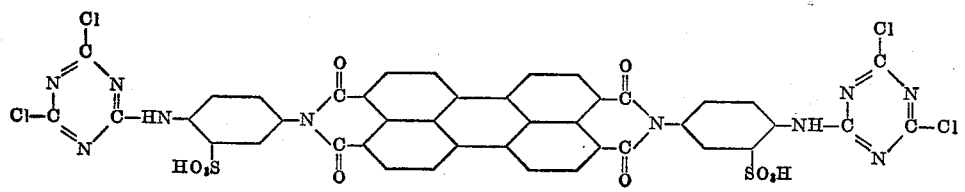

6. The peridicarboxylic acid imide dyestuff of the formula
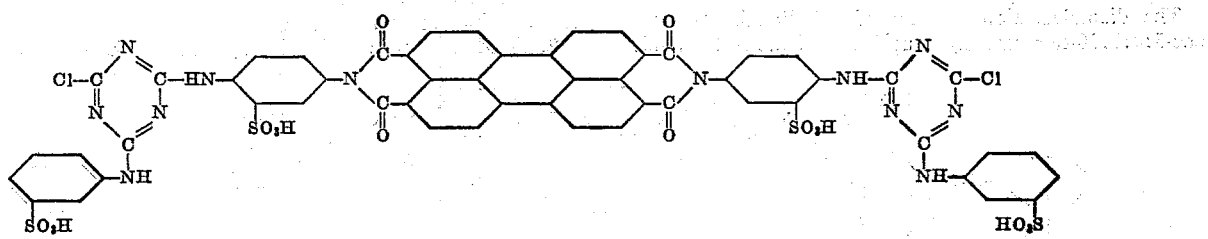
7. The peridicarboxylic acid imide dyestuff of the formula
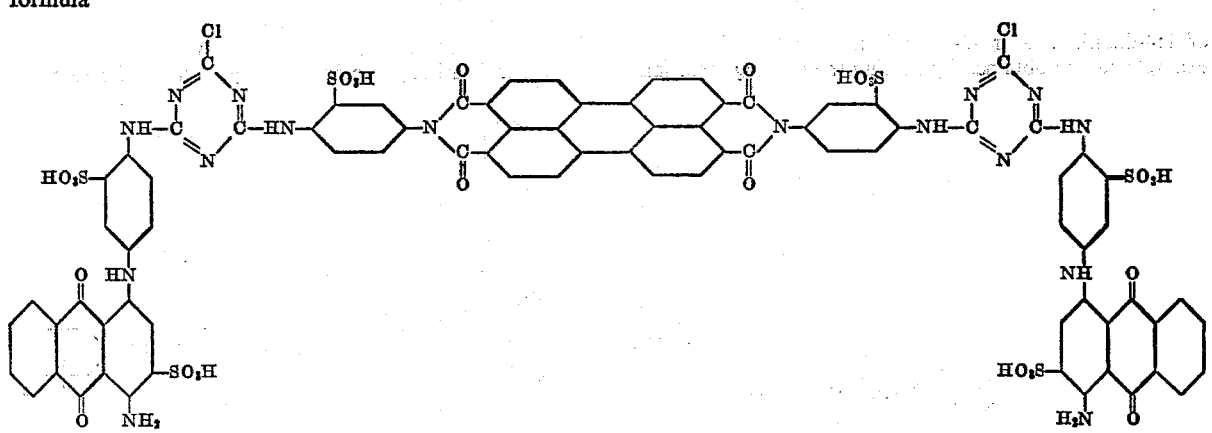
8. The peridicarboxylic acid imide dyestuff of the formula
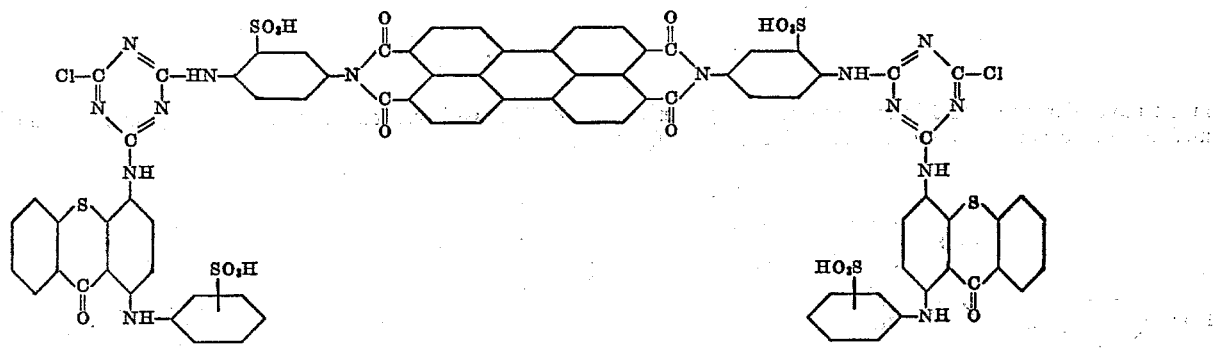
9. Peridicarboxylic acid imide dyestuffs of the formula
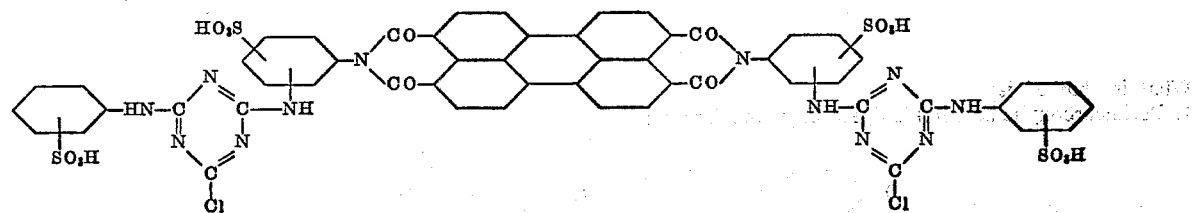
No references cited.